United States Patent
Ryu et al.

(10) Patent No.: US 11,501,884 B2
(45) Date of Patent: Nov. 15, 2022

(54) SYSTEM INCLUDING A MEMBER CONFIGURED TO SEPARATE A LOCK INSERT FROM A GUIDE HOLE IN A TOP NOZZLE PLATE OF A NUCLEAR FUEL ASSEMBLY

(71) Applicants: Su Pil Ryu, Daejeon (KR); Seong Soo Kim, Daejeon (KR); Ba Leum Kim, Daejeon (KR); Joo Hong Chun, Daejeon (KR); Nam Gyu Park, Daejeon (KR); Jong Sung Yoo, Daejeon (KR)

(72) Inventors: Su Pil Ryu, Daejeon (KR); Seong Soo Kim, Daejeon (KR); Ba Leum Kim, Daejeon (KR); Joo Hong Chun, Daejeon (KR); Nam Gyu Park, Daejeon (KR); Jong Sung Yoo, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 120 days.

(21) Appl. No.: 16/870,688

(22) Filed: May 8, 2020

(65) Prior Publication Data
US 2020/0373026 A1    Nov. 26, 2020

Related U.S. Application Data

(63) Continuation of application No. PCT/KR2017/013118, filed on Nov. 17, 2017.

(30) Foreign Application Priority Data

Nov. 9, 2017  (KR) .................. 10-2017-0148557

(51) Int. Cl.
*G21C 3/33*    (2006.01)

(52) U.S. Cl.
CPC ............. *G21C 3/33* (2013.01); *G21C 3/3315* (2013.01)

(58) Field of Classification Search
CPC ................................ G21C 3/33; G21C 3/3315
(Continued)

(56) References Cited

U.S. PATENT DOCUMENTS 4,664,875 A * 5/1987 Shallenberger ........ G21C 3/334
376/261
4,699,759 A * 10/1987 Feild ...................... G21C 3/334
376/446

(Continued)

FOREIGN PATENT DOCUMENTS

DE         2520345 A1 * 11/1976
KR    10-1999-006474 A     1/1999
(Continued)

*Primary Examiner* — Jack W Keith
*Assistant Examiner* — Daniel Wasil
(74) *Attorney, Agent, or Firm* — Reinhart Boerner Van Deuren P.C.

(57) ABSTRACT

System for separating and coupling a nuclear fuel assembly from/to a top nozzle which has a flow channel plate with guide holes. The system includes a lock insert and a separation member. The lock insert includes an insertion part provided on a top portion of a hollow body. The separation member is configured to separate the insertion part from a guide hole. The insertion part is variable in size. The insertion part comprises a first latching member and a second latching member, each having a step which contacts the flow channel plate. The first latching member includes a latching groove which is inserted into a member protruding from the top surface of the flow channel plate. The second latching member contacts a bottom surface of the flow (Continued)

channel plate. The separation member provides a space accommodating an outer circumferential surface of the first latching member.

2 Claims, 6 Drawing Sheets

(58) Field of Classification Search
USPC .......................................................... 376/446
See application file for complete search history.

(56) References Cited

U.S. PATENT DOCUMENTS 5,091,142 A * 2/1992 Petit ........................ G21C 3/334
376/446
5,844,958 A * 12/1998 Leroux ................... G21C 3/334
376/446

FOREIGN PATENT DOCUMENTS

| KR | 10-0352200 B1 | 12/2002 |
| KR | 10-2006-0129231 A | 12/2006 |
| KR | 10-1162002 B1 | 7/2012 |
| WO | WO 2013/172488 A1 | 11/2013 |

* cited by examiner

SYSTEM INCLUDING A MEMBER CONFIGURED TO SEPARATE A LOCK INSERT FROM A GUIDE HOLE IN A TOP NOZZLE PLATE OF A NUCLEAR FUEL ASSEMBLY

CROSS REFERENCE TO RELATED APPLICATION

The present application is a continuation of PCT Application No. PCT/KR2017/013118, filed Nov. 17, 2017, which claims priority to Korean Patent Application No. 10-2017-0148557, filed Nov. 9, 2017, the entire contents of which is incorporated herein for all purposes by this reference.

TECHNICAL FIELD

The present invention relates generally to a lock insert of a nuclear fuel assembly top nozzle, and a separating and coupling system of the nuclear fuel assembly top nozzle, including same and, more particularly, to a fastening structure of a top nozzle and a lock insert for improving a performance of disassembling and reassembling the nuclear fuel assembly top nozzle.

BACKGROUND ART

A nuclear reactor is a device made to be used for various purposes such as generating heat by artificially controlling a fission chain reaction of fissile material, producing radioisotopes and plutonium, or forming a radiation field.

More specifically, in typical light water reactors, enriched uranium that a ratio of uranium-235 is increased to 2-5% is used. In order for nuclear fuel to be used in nuclear reactors, uranium is processed into cylindrical pellets weighing about 5 g. Such pellets are charged into a zircaloy cladding tube, then one spring and helium gas are inserted into the cladding tube, and then a fuel rod is manufactured by welding an upper end cap of the cladding tube. The fuel rods finally form a nuclear fuel assembly and are burned by nuclear reactions in the reactor.

FIG. 1 is a view showing a typical nuclear fuel assembly. With reference to FIG. 1, a nuclear fuel assembly 1 includes a skeleton, which is composed of a top nozzle 2, a bottom nozzle 4, spacer grids 6, guide thimbles 8, an instrumentation tube 12, and the like, and fuel rods inserted into and supported by the spacer grids 6.

The spacer grids 6 are arranged in the nuclear fuel assembly 1 in a number of about 10 to 13 from an upper side to a lower side and are welded with the guide thimbles 8 having length of 4 m. Assembling the nuclear fuel assembly 1 is completed by charging the fuel rods into the skeleton and then attaching and fixing the top nozzle 2 and the bottom nozzle 4. In other words, the nuclear fuel assembly 1 is arranged such that the fuel rods are maintained at a constant distance between the top nozzle 2 and the bottom nozzle 4 by the spacer grids 6 and the guide thimbles 8 as shown in FIG. 1.

FIG. 2 is a view illustrating a typical top nozzle 2. With reference to FIG. 2, the top nozzle 2 includes a flow channel plate 24, and the flow channel plate 24 includes a instrumentation fixing hole 26 to which the instrumentation tube is fixed, guide holes 22 to which top nozzle is coupled, and flow channel holes 28 through which coolant flows.

During the operation of the reactor, hydraulic uplift force due to the flow of coolant may be applied to the nuclear fuel assembly 1, thereby causing the assembly to be raised or vibrated. In addition, the nuclear fuel assembly may be subjected to an axial length change due to thermal expansion by an increase in temperature or due to irradiation growth and creep of the nuclear fuel cladding tube by long-term neutron irradiation. At this time, the top nozzle 2 is coupled to the guide thimbles to support a load of an axial direction, thereby functioning to maintain mechanical and structural stability of the nuclear fuel assembly.

On the other hand, the guide thimbles are usually coupled to the flow channel plate 24 together with the top nozzle insert to be firmly coupled to the flow channel plate 24 and are configured to be engaged into the top nozzle insert by a bulging process while coupling the top nozzle insert to the flow channel plate 24.

FIG. 3 is a view showing an above-mentioned fastening structure of the top nozzle and the top nozzle insert generally used. The fastening structure 30 of the top nozzle and the top nozzle insert is configured such that the top nozzle insert 31 is inserted into the guide hole 22 provided in the flow channel plate 24 at a side below the guide hole 22, and in order to prevent the coupling of the top nozzle insert from being released, a lock tube 33 is inserted into an inner circumferential surface of the top nozzle insert at a side above the guide hole 22, thereby being fastened.

However, when the top nozzle and the guide thimbles are separated from each other in a state of the above-described conventional configuration, it is not easy to dismantle and difficult to work remotely, because the top nozzle insert 31 and the lock tube 33 are provided being inserted into the guide hole 22 of the flow channel plate.

DISCLOSURE

Technical Problem

Accordingly, the present invention has been made to solve the above-described problems, and an object thereof is to provide a fastening structure of a top nozzle and a lock insert for improving a performance of disassembling and reassembling the top nozzle of a nuclear fuel assembly.

Technical Solution

In order to accomplish the above objective, there may be provided a lock insert of a nuclear fuel assembly top nozzle, the lock insert being configured to support the nuclear fuel assembly top nozzle by being coupled to a guide hole provided in a flow channel plate of the top nozzle, the lock insert including: a body in a hollow shape, and an insertion part provided on a top portion of the body and configured to be inserted into the guide hole, wherein a circumference of the insertion part may be variable in size, thereby being capable of being inserted into the guide hole.

The insertion part may include: a first latching member fixed by being brought into contact with a top surface of the flow channel plate; and a second latching member fixed by being brought into contact with a bottom surface of the flow channel plate.

In addition, the first latching member may include a latching groove, and a protruding member protrudingly provided on the top surface of the flow channel plate may be inserted into the latching groove.

The insertion part may be provided with at least one predetermined interval along a circumferential direction thereof at a position between the first latching member and the second latching member, and the circumference of the insertion part may be variable in size as much as the predetermined interval.

The insertion part may be provided with at least one insertion member at a predetermined interval along a circumferential direction thereof at a position between the first latching member and the second latching member, and the circumference of the insertion part may be variable in size as much as the predetermined interval.

Meanwhile, there may be provided a separating and coupling system of a nuclear fuel assembly top nozzle, the system including: a top nozzle; a flow channel plate provided at a lower portion of the top nozzle and allowing coolant to pass therethrough; a guide hole provided in the flow channel plate; a lock insert in a hollow shape including an insertion part configured to be inserted into the guide hole; and a separation member configured to separate the lock insert from the guide hole, wherein a circumference of the insertion part of the lock insert may be variable in size, thereby being capable of being inserted into and separated from the guide hole.

In addition, the insertion part may include: a first latching member fixed by being brought into contact with a top surface of the flow channel plate; and a second latching member fixed by being brought into contact with a bottom surface of the flow channel plate.

In addition, the first latching member may include a latching groove; and a protruding member protrudingly provided on the top surface of the flow channel plate may be inserted into the latching groove.

In addition, the insertion part may be provided with at least one predetermined interval along a circumferential direction thereof at a position between the first latching member and the second latching member; and the circumference of the insertion part may be variable in size as much as the predetermined interval.

In addition, the insertion part may be provided with at least one insertion member at a predetermined interval along a circumferential direction thereof at a position between the first latching member and the second latching member; and the circumference of the insertion part may be variable in size as much as the predetermined interval.

Advantageous Effects

As described above, according to the present invention, disassembly and reassembly of the top nozzle of the nuclear fuel assembly and the lock insert are simplified, thereby simplifying and reducing the number of processes involved therein. Accordingly, the system is effective for maintenance and repair of the nuclear fuel assembly.

In addition, the number of parts is reduced to increase the handleability, so that it is easy to work remotely for repairing a nuclear fuel assembly.

The effects of the present invention are not limited to those described above, and other effects not mentioned will be clearly recognized by those skilled in the art from the following description.

DETAILED DESCRIPTION

Hereinafter, with reference to the drawings will be described the present invention in more detail. It should be noted that the same elements in drawings are denoted by the same numerals wherever possible. In addition, descriptions of well-known functions and configurations that may unnecessarily obfuscate the subject matter of the present invention will be omitted.

In addition, various changes may be made to the embodiments described below. The examples described below are not intended to be limiting the embodiments but should be understood to include all modifications, equivalents, and substitutes therefor.

Herebelow, descriptions will be given logically according to the drawings.

Figure 1:
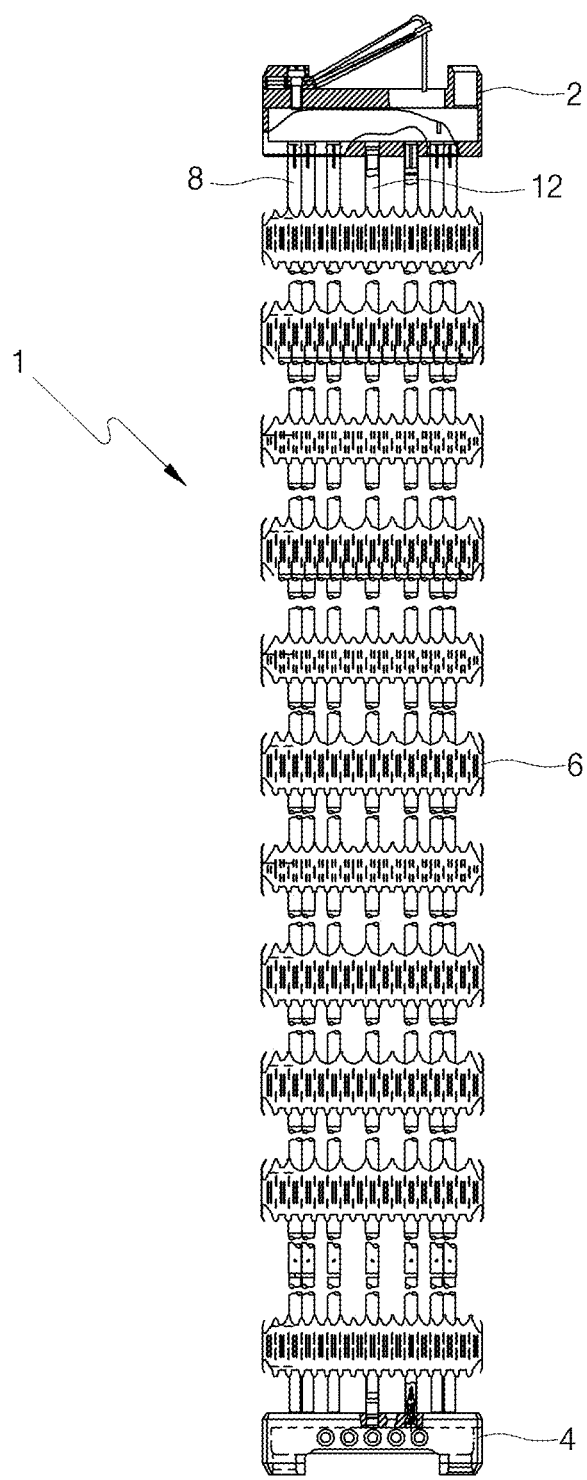
FIG. 1 is a view showing an overall configuration of a typical nuclear fuel assembly.
Figure 2:
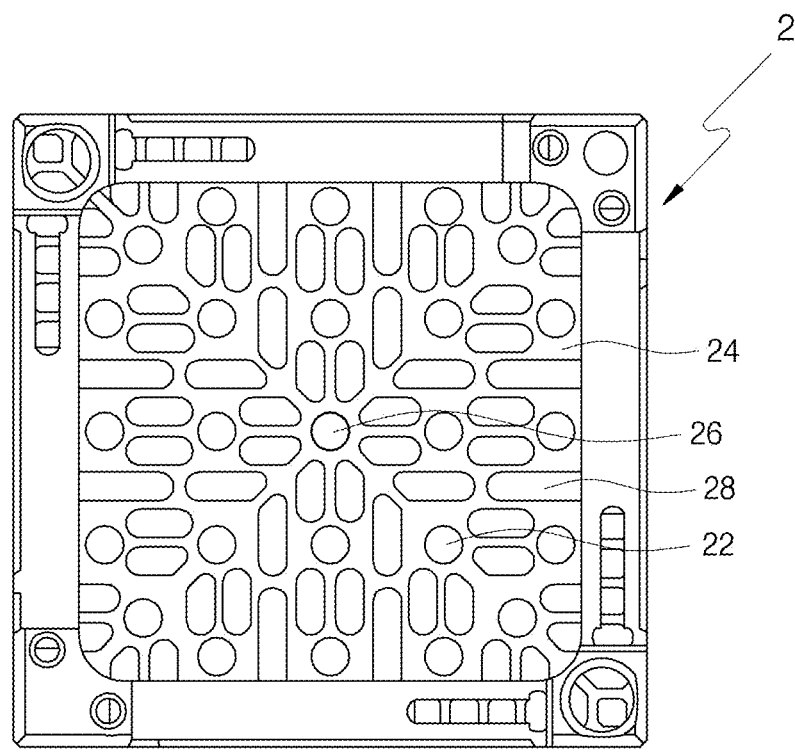
FIG. 2 is a view showing a top nozzle of a typical nuclear fuel assembly.
Figure 3:
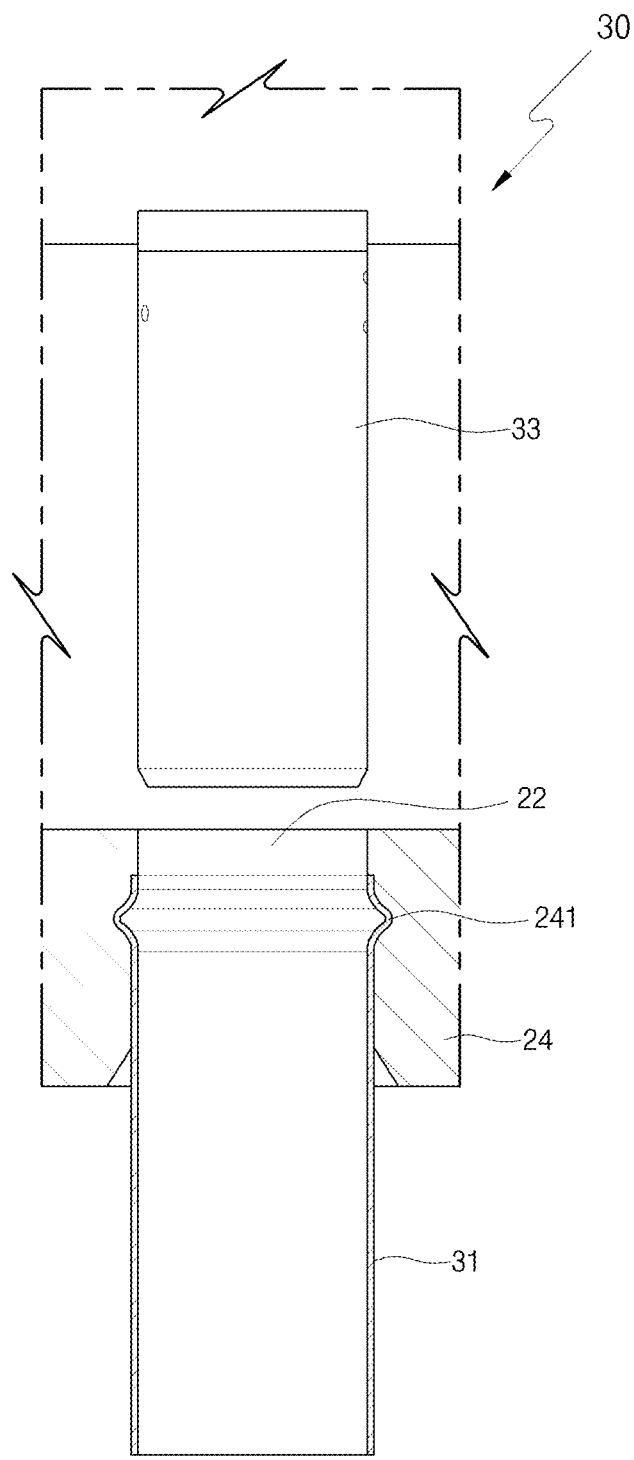
FIG. 3 is a view showing a fastening structure of the top nozzle and a top nozzle insert of a typical nuclear fuel assembly.
Figure 4:
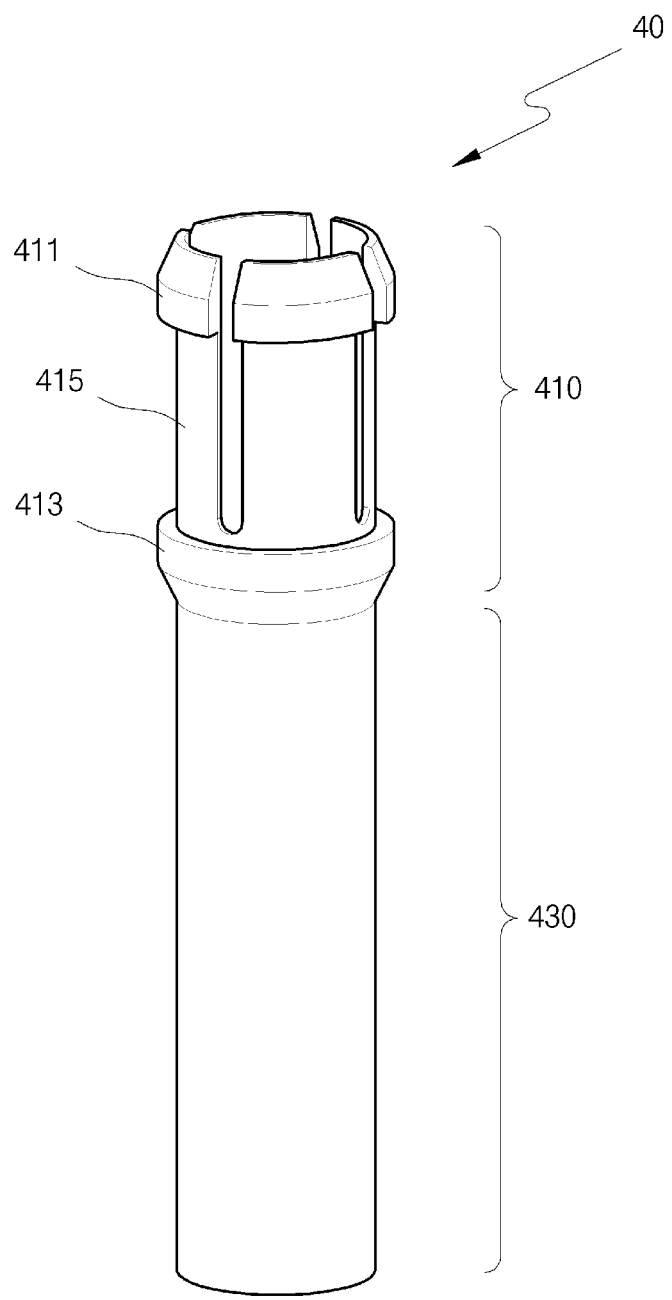
FIG. 4 is a view showing a lock insert of a nuclear fuel assembly top nozzle according to an embodiment of the present invention.

FIG. 2 is a view showing a top nozzle of a typical nuclear fuel assembly, and FIG. 4 is a view showing a lock insert of a nuclear fuel assembly top nozzle according to an embodiment of the present invention.

With reference to FIG. 2, the top nozzle 2 of the typical nuclear fuel assembly includes a guide hole 22, a flow channel plate 24, an instrumentation fixing hole 26, and a flow channel hole 28, and is configured to be a structure in which such holes are provided in the flow channel plate 24. Hereinafter, descriptions overlapping with the above description with respect to each of components will be omitted.

With reference to FIG. 4, the lock insert 40 of the present embodiment includes an insertion part 410 and a body 430, wherein the insertion part 410 includes a first latching member 411, a second latching member 413, and an insertion member 415.

On the other hand, taking a look at each of the components or coupling between the components, the body 430 is provided in a hollow shape for supporting the top nozzle, and the insertion part 410 is provided on a top portion of the body 430 and configured to be inserted into the guide hole 22.

More specifically, the circumference of the insertion part 410 is configured to be variable in size, thereby being inserted into the guide hole 22. Therefore, the insertion part 410 may be made of an elastic material so that the circumference thereof may vary in size or may be configured to have a structure in which at least one predetermined interval is provided, whereby the circumference of the insertion part is variable in size as much as the predetermined interval. Alternatively, the insertion part 410 may be configured to have a structure in which at least one insertion member 415 is provided at a predetermined interval along the circumferential direction, whereby the circumference of the insertion part is varied in size as much as the predetermined intervals between the insertion members 415.

In addition, the first latching member 411 and the second latching member 413 are provided at opposite ends of the insertion part 410, wherein the first latching member 411 is brought into contact with a top surface of a flow channel plate 24, thereby fixing the lock insert 40 to the flow channel plate 24, and the second latching member 413 is brought into contact with a bottom surface of the flow channel plate 24, thereby fixing the lock insert 40 to the flow channel plate 24.

On the other hand, according to the above-described configuration of the present embodiment, the circumference of the insertion part 410 of the lock insert 40 is variable in size, whereby the insertion part is easily inserted into the guide hole 22. After being inserted, the first latching member 411 and the second latching member 413 are each brought into contact with the top and bottom surfaces of the flow channel plate and fixed, thereby firmly fixing the lock insert 40 to the flow channel plate 24.

In addition, disassembly of the lock insert from the flow channel plate 24 may also be performed by varying the size of the circumference of the insert part 410 and then by lifting the body 430 or the top nozzle 2.

Figure 5:
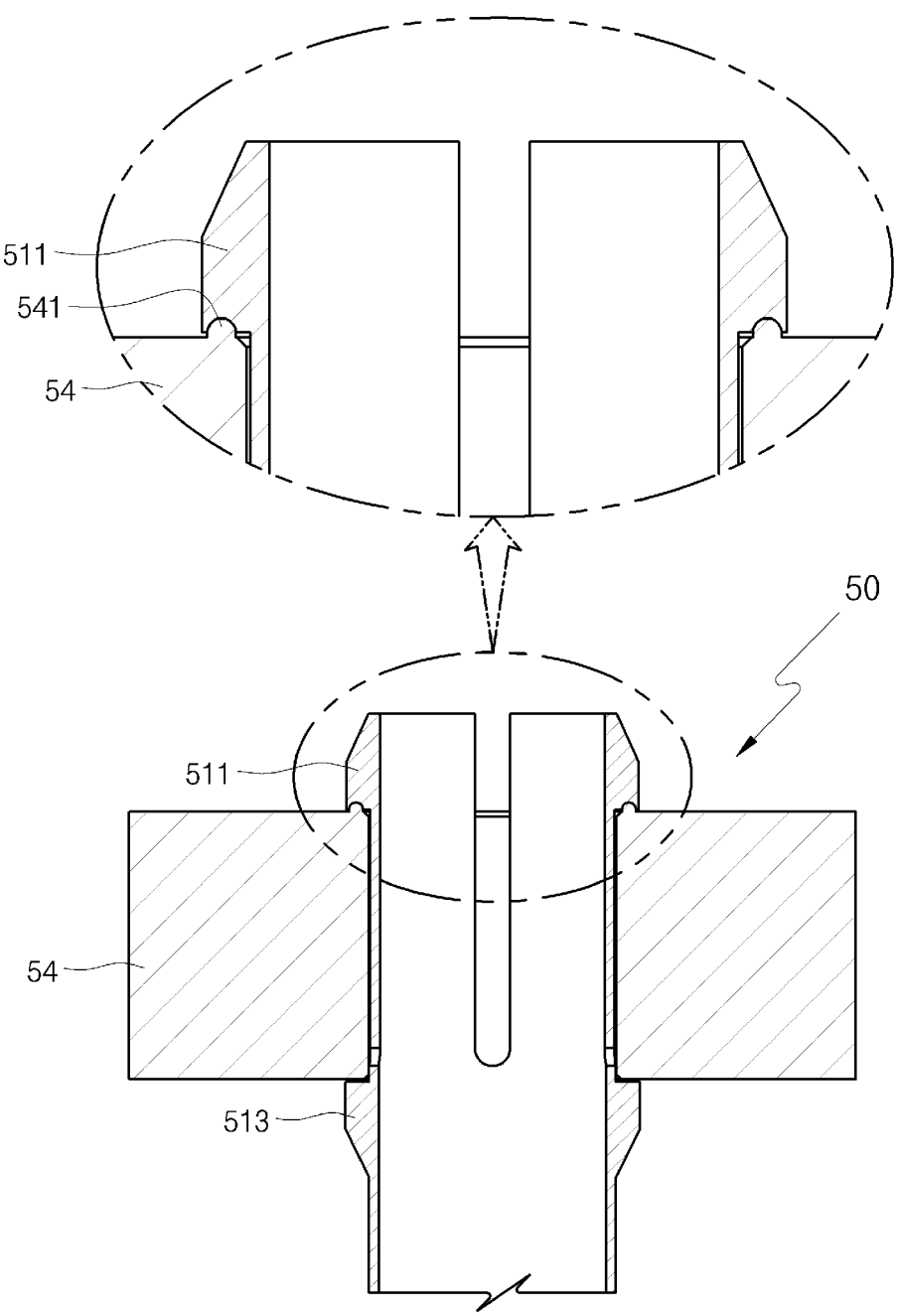
FIG. 5 is a view showing a fastening structure of a lock insert of a nuclear fuel assembly top nozzle according to another embodiment of the present invention.

FIG. 5 is a view showing a fastening structure of a lock insert of a nuclear fuel assembly top nozzle according to another embodiment of the present invention.

With reference to FIG. 5, the fastening structure 50 of the lock insert of the present embodiment is fixed to the flow channel plate 54. More specifically, the top surface, of the flow channel plate 54, and the first latching member 511 are brought into contact with and fixed to each other, and the bottom surface, of the flow channel plate 54, and the second latching member 513 are brought into contact with and fixed to each other. In addition, the first latching member 511 includes a latching groove, and the flow channel plate 54 includes a protruding member 541 (641 in FIG. 6).

Taking a look at each of the above-described components or coupling between the components, the first latching member 511 and the second latching member 513 may be provided to have an interval therebetween as much as a thickness of the flow channel plate 54, thereby being brought into contact with and fixed to the top and bottom surfaces, respectively, of the flow channel plate 54. In addition, the first latching member 511 is provided with the latching groove, at a portion with which the top surface of the flow channel plate 54 is brought into contact, and coupled to the protruding member 541 protruded on the top surface of the flow channel plate 54. Accordingly, a coupling of the lock insert and the flow channel plate 54 may be more firmly made.

Meanwhile, according to the above-described configuration of the present embodiment, size or shapes of the protruding member 541 and the latching groove of the first latching member 511 are not necessarily limited to the present embodiment. However, when external force is applied to opposite side surfaces to make the circumference of the insert part 410 to be varied in size, a shape that allows the latching groove and the protruding member 541 to be easily broken away from each other is to be included. That is, the size of the latching groove and a degree that the protrudingly provided protruding member 541 is curved may include various shapes each of which does not act as an element restricting a variation of the size of the circumference of the insert part 410.

Figure 6:
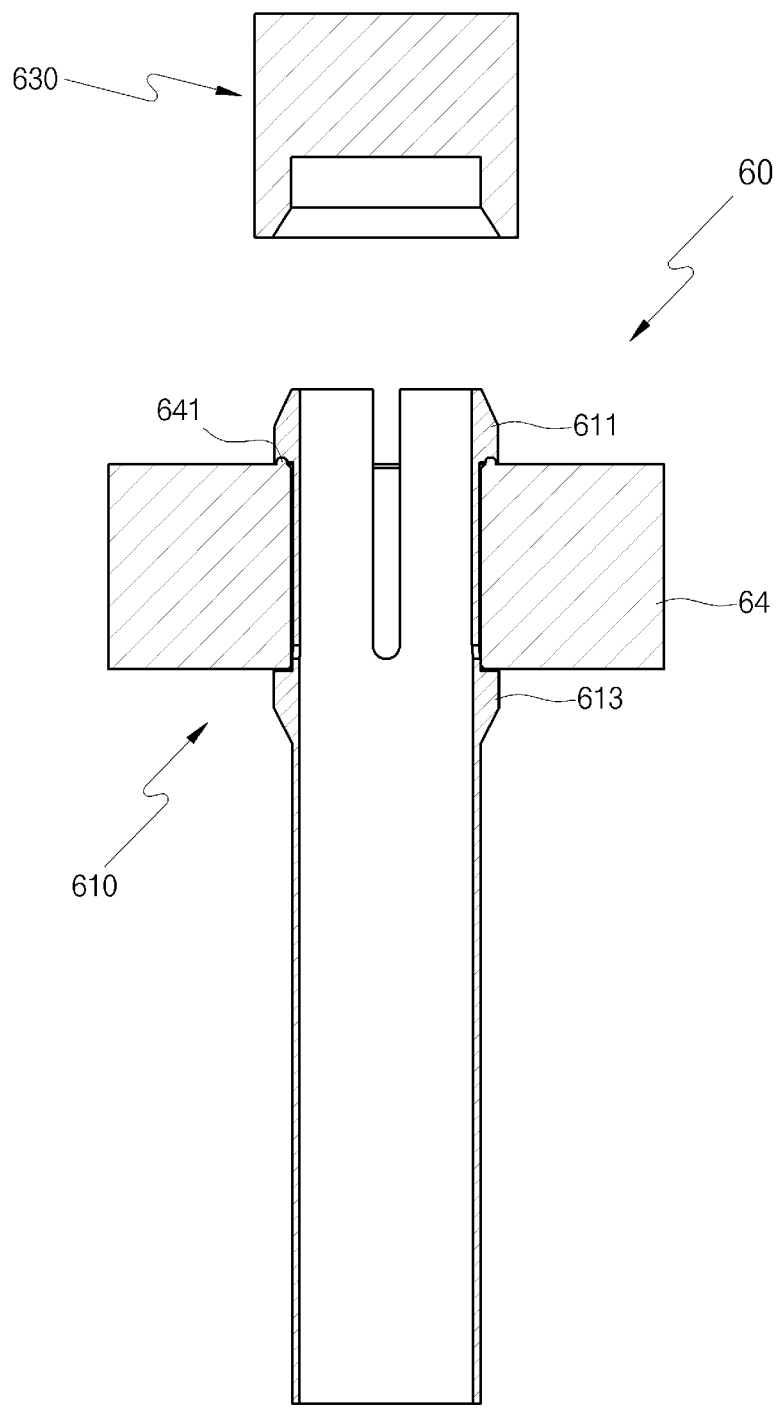
FIG. 6 is a view showing an overall configuration of a separating and coupling system of a top nozzle of a nuclear fuel assembly according to still another embodiment of the present invention.

FIG. 6 is a view showing an overall configuration of a separating and coupling system of a nuclear fuel assembly top nozzle according to still another embodiment of the present invention.

With reference to FIG. 6, the system 60 of the present embodiment includes an insertion part 610 of the lock insert and a separation part 630. More specifically, the insertion part 610 includes a first latching member 611 and a second latching member 613. Hereinafter, descriptions overlapping with the above-described embodiments will be omitted. Taking a Look at each of the above-described components or coupling between the components, the insertion part 610 is inserted penetrating through a guide hole provided in the flow channel plate 64, thereby being fixed to the flow channel plate 64, wherein the first latching member 611 is brought into contact with the top surface of the flow channel plate 64, and the second latching member 613 is brought into contact with the bottom surface of the flow channel plate 64.

The separation part 630 is configured to provide a space accommodating an outer circumferential surface of the first latching member 611 protrudingly provided on the top surface of the flow channel plate 64. That is, when the structure of the first latching member 611 is changed to an extent that may be embodied by those skilled in the art, the internal space of the separation member 630 may also have a different shape accordingly.

In addition, the inner space of the separation member 630 may have at least one inclination on an inner circumferential surface thereof and the circumference of the inner space may include a shape having the circumference of at least one size according to the inclination.

Meanwhile, according to the above-described configuration of the present embodiment, the separation member 630 applies external force to an outer circumferential surface of the first latching member 611 while accommodating the outer circumferential surface of the first latching member 611.

As the external force is applied to the outer circumferential surface of the first latching member 611, the size of the circumference of the insertion part 610 may be varied to release the coupling between the lock insert and the flow channel plate 64.

The separation member 630 may have the inner circumferences having different sizes due to the inclination, and the user may specify a variable size of the circumference of the insertion part 610 such that the separation member 630 accommodates the outer circumferential surface of the first latching member 611 by the different sizes of the circumference.

On the other hand, the present invention is not limited to the embodiments and the accompanying drawings in the above description, and it will be obvious for those skilled in the art that various substitutions, modifications, and changes are possible within the scope without departing from the spirit of the present invention.

<Description of the Reference Numerals in the Drawings>

| | |
|---|---|
| 1: Nuclear fuel assembly | 2: Top nozzle |
| 4: Bottom nozzle | 6: Spacer grid |
| 8: Guide thimble | 12: Instrumentation tube |
| 22: Guide hole | 24, 54, 64: Flow channel plate |
| 241: Groove | 26: Instrumentation fixing hole |
| 28: Flow channel hole | 30: Fastening structure |
| 31: top nozzle insert | 33: Lock tube |
| 40: Lock insert | 410, 610: insertion part |
| 411, 511, 611: First latching member | 413, 513, 613: second latching member |
| 415: Insertion member | 430: Body |

| <Description of the Reference Numerals in the Drawings> | |
|---|---|
| 50: Fastening structure of lock insert | 541: Protruding member |
| 60: Separating and coupling system of nuclear fuel assembly top nozzle | 630: Separation member |

The invention claimed is:

1. A system for separating and coupling a nuclear fuel assembly having guide thimbles from/to a top nozzle including a flow channel plate for flow of coolant having guide holes, the system comprises:

a lock insert comprising a body in a hollow shape coupled with the guide thimble; and an insertion part provided on a top portion of the body and configured to be inserted into the guide hole, the circumference of the insertion part being variable in size, thereby being capable of being inserted into the guide hole, to support the nuclear fuel assembly to the top nozzle by being coupled to the guide hole provided in a flow channel plate of the top nozzle; and a separation member configured to separate the lock insert from the guide hole, wherein, the insertion part comprises:

a first latching member having a step with which a top surface of the flow channel plate is brought into contact; and a second latching member having a step with which a bottom surface of the flow channel plate is brought into contact, wherein the first latching member comprises a latching groove, and the top surface of the flow channel plate is provided a protruding member protruded from the top surface, the protruding member being of the same shape as the latching groove to be inserted into the latching groove, and the separation part is configured to provide a space accommodating an outer circumferential surface of the first latching member protrudingly provided on the top surface of the flow channel plate, to apply external force to the outer circumferential surface of the first latching member while accommodating the outer circumferential surface of the first latching member, thereby the size of the circumference of the insertion part being varied to release the coupling between the lock insert and the flow channel plate.

2. The system of claim 1, wherein the insertion part is provided with at least one predetermined slot along a longitudinal direction of the insertion part, thereby the circumference of the insertion part is variable in size.

* * * * *